United States Patent
Ohtsuka

(10) Patent No.: US 10,555,062 B2
(45) Date of Patent: Feb. 4, 2020

(54) SOUND PICK UP DEVICE WITH SOUND BLOCKING SHIELDS AND IMAGING DEVICE INCLUDING THE SAME

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/447,243

(22) Filed: Mar. 2, 2017

(65) Prior Publication Data

US 2018/0063617 A1 Mar. 1, 2018

(30) Foreign Application Priority Data

Aug. 31, 2016 (JP) .................................. 2016-168929
Dec. 16, 2016 (JP) .................................. 2016-243909

(51) Int. Cl.
*H04N 5/225* (2006.01)
*H04R 1/08* (2006.01)
(Continued)

(52) U.S. Cl.
CPC ............. *H04R 1/086* (2013.01); *G03B 17/08* (2013.01); *H04N 5/23258* (2013.01);
(Continued)

(58) Field of Classification Search
CPC ................................ G03B 17/08; H04R 1/086
See application file for complete search history.

(56) References Cited

U.S. PATENT DOCUMENTS 5,563,954 A 10/1996 Ono et al.
2003/0161484 A1 8/2003 Kanamori et al.
(Continued)

FOREIGN PATENT DOCUMENTS

JP 06-253387 A 9/1994
JP 2000-004494 A 1/2000
(Continued)

OTHER PUBLICATIONS

The Extended European Search Report dated Oct. 13, 2017 for the related European Patent Application No. 17163721.8.
(Continued)

*Primary Examiner* — Gary C Vieaux
(74) *Attorney, Agent, or Firm* — Renner, Otto, Boisselle & Sklar, LLP

(57) ABSTRACT

Provided is a sound pick-up device which includes: a housing having a sound hole; a main microphone which is disposed in the inside of the housing, receives sound pressure from the outside of the housing through the sound hole, and generates a first sound signal; a reference microphone which is disposed in the inside of the housing and in a proximity of the main microphone and generates a second sound signal; a first shield which blocks between the inside of the housing and the inside of the main microphone; a second shield which blocks between the outside of the housing and the inside of the reference microphone; and a third shield which blocks between the inside of the housing and the inside of the reference microphone.

10 Claims, 13 Drawing Sheets

(51) Int. Cl.
*G03B 17/08* (2006.01)
*H04N 5/232* (2006.01)
*H04R 3/00* (2006.01)
*H04R 5/027* (2006.01)

(52) U.S. Cl.
CPC ........... *H04N 5/23287* (2013.01); *H04R 1/08* (2013.01); *H04R 3/005* (2013.01); *H04R 5/027* (2013.01); *H04R 2410/05* (2013.01); *H04R 2499/11* (2013.01)

(56) References Cited

U.S. PATENT DOCUMENTS

| | | | | |
|---|---|---|---|---|
| 2008/0152154 | A1* | 6/2008 | Daishin | H04R 5/027 381/26 |
| 2010/0054495 | A1 | 3/2010 | Harney et al. | |
| 2010/0322437 | A1* | 12/2010 | Matsuo | G10L 21/0208 381/94.2 |
| 2011/0063461 | A1 | 3/2011 | Masuda | |
| 2012/0257779 | A1 | 10/2012 | Kimura et al. | |
| 2012/0308220 | A1* | 12/2012 | Ohtsuka | G03B 17/14 396/312 |
| 2013/0343572 | A1* | 12/2013 | Lee | H04M 1/03 381/92 |
| 2016/0077409 | A1* | 3/2016 | Samuels | G03B 17/02 396/27 |

FOREIGN PATENT DOCUMENTS

| | | |
|---|---|---|
| JP | 2006-352342 A | 12/2006 |
| JP | 2010-213099 A | 9/2010 |
| JP | 2011-114465 A | 6/2011 |
| JP | 2016-090799 A | 5/2016 |

OTHER PUBLICATIONS

Communication pursuant to Article 94(3) EPC dated Nov. 26, 2018 for the related European Patent Application No. 17163721.8.

* cited by examiner

FIG. 12

| | Drawing | Second shield | Third shield | Direction of reference microphone with respect to direction of main microphone |
|---|---|---|---|---|
| First exemplary embodiment | Fig. 5 | Case | Printed circuit board | Same direction |
| First modified example | Fig. 7 | Rubber member | Printed circuit board | Same direction |
| Second modified example | Fig. 8 | Case<br>Rubber member | Printed circuit board | Same direction |
| Third modified example | Fig. 9 | Case<br>Printed circuit board | Rubber member | 180° |
| Fourth modified example | Fig. 10 | Printed circuit board | Rubber member | 180° |
| Fifth modified example | Fig. 11 | Case of microphone<br>Rubber member<br>Case | Case of microphone<br>Rubber member | 90° |
| Second comparative example | Fig. 15 | Printed circuit board<br>Case | None | 90° |

SOUND PICK UP DEVICE WITH SOUND BLOCKING SHIELDS AND IMAGING DEVICE INCLUDING THE SAME

BACKGROUND

1. Technical Field

The present disclosure relates to a sound pick-up device which collects sound, and an imaging device including the sound pick-up device.

2. Description of the Related Art

Conventionally, there is known a sound processing device which has an auto level control (ALC) function by which the magnitude of input sound is controlled at an appropriate level (for example, see Patent Literature 1).

Unexamined Japanese Patent Publication No. 2000-4494 discloses a microphone device which reduces an internal noise being mixed when an external sound is being collected, where an equipment housing contains a mechanism which generates noise when the equipment is operated. This microphone device is equipped with: a main microphone which collects an external sound coming from the outside of an equipment housing; a noise reference microphone provided in the inside of the equipment housing; an adaptive filter which acquires a signal detected by the noise reference microphone and generates a control sound signal by using a renewed filter coefficient; a signal subtractor which subtracts the control sound signal of the adaptive filter from an output signal of the main microphone; a signal level comparator which compares a level of the output signal of the main microphone and a level of the detected signal of the noise reference microphone; and a filter coefficient renewal controller which acquires a comparison result of the signal level comparator, a subtraction result of the signal subtractor, and the detected signal of the noise reference microphone and which renews, when an output level of noise reference microphone is greater than an output level of the main microphone, the filter coefficient of the adaptive filter so that the subtraction result of the signal subtractor becomes minimum. Because this microphone device gives a signal from the noise reference microphone to the adaptive filter to generate the control sound signal and cancels noise by this control sound signal; thus, it is possible to reduce an internal noise being mixed in at the time of collecting an external sound.

SUMMARY

The present disclosure is a sound pick-up device equipped with a housing, a main microphone, a reference microphone, a first shield, a second shield, and a third shield. The housing has a sound hole. The main microphone is disposed in the inside of the housing, receives sound pressure from the outside of the housing through the sound hole, and generates a first sound signal. The reference microphone is disposed in the inside of the housing and in the vicinity of the main microphone and generates a second sound signal. The first shield blocks between the inside of the housing and the inside of the main microphone. The second shield blocks between the outside of the housing and the inside of the reference microphone. The third shield blocks between the inside of the housing and the inside of the reference microphone.

Further, the present disclosure is an imaging device equipped with an imaging unit, a sound pick-up device, and a controller. The imaging unit takes an image of an object to generate an image signal. The sound pick-up device has a housing, a main microphone, a reference microphone, a first shield, a second shield, and a third shield. The housing has a sound hole. The main microphone is disposed in the inside of the housing, receives sound pressure from the outside of the housing through the sound hole, and generates a first sound signal. The reference microphone is disposed in the inside of the housing and in the vicinity of the main microphone and generates a second sound signal. The first shield blocks between the inside of the housing and the inside of the main microphone. The second shield blocks between the outside of the housing and the inside of the reference microphone. The third shield blocks between the inside of the housing and the inside of the reference microphone. The controller stores the image signal in a predetermined recording medium together with a sound signal.

The sound pick-up device of the present disclosure can reduce noise contained in a sound signal when collecting sound on the outside of electronic device and generating the sound signal.

BRIEF DESCRIPTION OF THE DRAWINGS

FIG. 12 is a diagram showing a comparison table of the arrangement configurations of the reference microphone in the present disclosure and a comparative example;

DETAILED DESCRIPTION

Hereinafter, exemplary embodiments will be described in detail appropriately with reference to the drawings. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventor provides the attached drawing and the following description to help the skilled in the art to sufficiently understand the present disclosure and does not intend to use the drawings or the description to limit the subject matters of the claims.

First Exemplary Embodiment

Hereinafter, a first exemplary embodiment will be described with reference to the drawings.

In the first exemplary embodiment, a digital camera capable of outputting a sound signal is described as an aspect of an example of an imaging device. This digital camera is dust and splash proof. That is, the structure of the digital camera has a sealed structure as a whole. Therefore, there are few routes through which noise generated in the inside of the digital camera escapes, and the noise is likely to stay inside. Further, if a digital camera has a higher resolution, a taken image is more likely to be affected by hand shake. Therefore, a digital camera is preferably equipped with a high performance image stabilization mechanism, but the image stabilization mechanism is likely to generate noise. That is, in a case of a dust and splash proof and high resolution digital camera, noise is more likely to be generated in the inside of the digital camera, and the noise is likely to stay inside. In the first exemplary embodiment, it is possible to suppress noise contained in a sound signal collected by a main microphone, by using a reference microphone.

[1-1. Configuration]

[1-1-1. Overall Structure]

Figure 1:
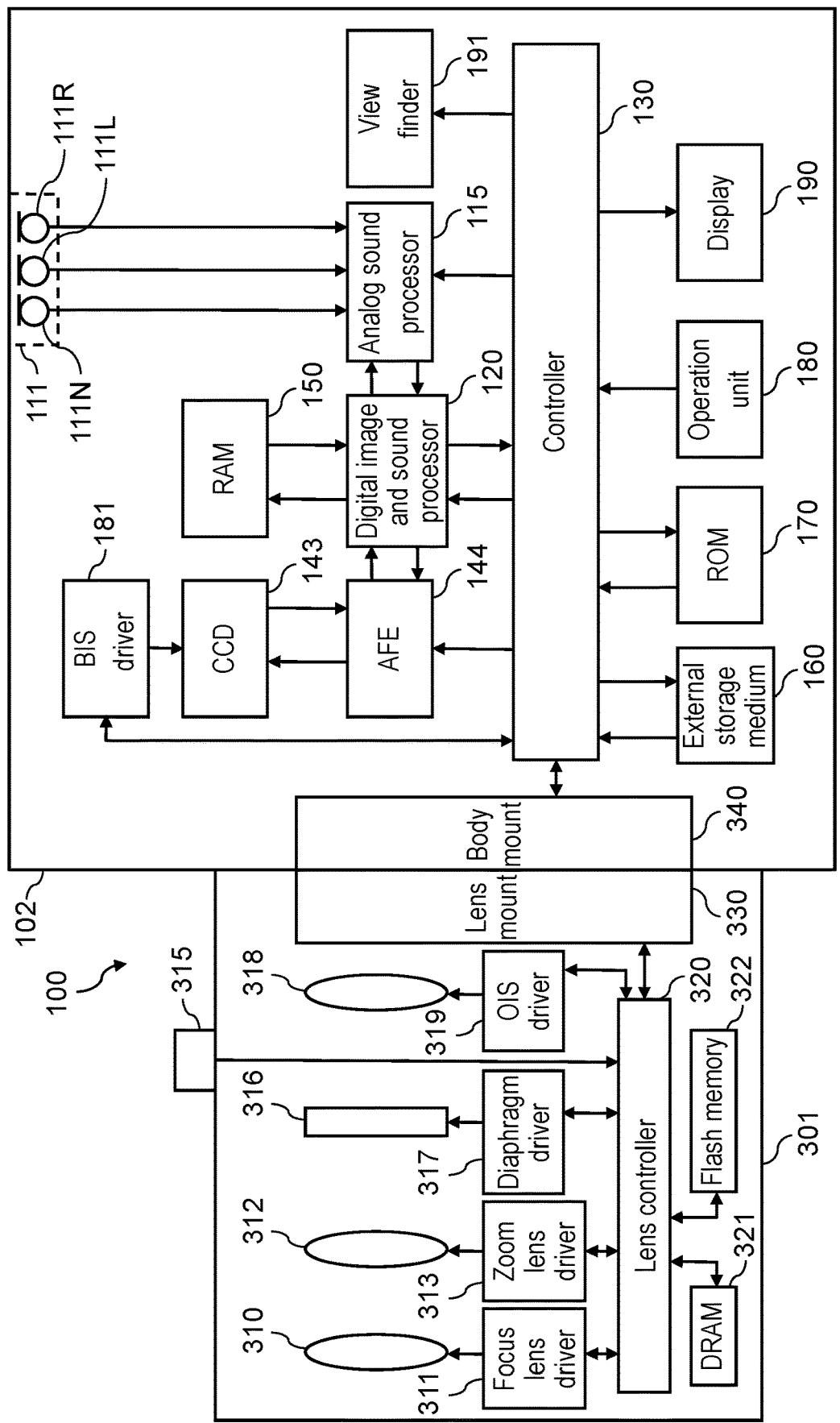
FIG. 1 is a diagram showing a configuration of an imaging device equipped with a sound pick-up device of the present disclosure.

FIG. 1 is a diagram showing a configuration of digital camera 100 as an exemplary embodiment of an imaging device equipped with a sound pick-up device according to the present disclosure. Digital camera 100 takes an image of an object to generate an image data (still image or moving image) and stores the image data in a recording medium. Digital camera 100 is configured with camera body 102 and interchangeable lens 301 to be attached to camera body 102. Digital camera 100 can also acquire sound when taking a moving image and can store sound data in a recording medium together with the image data.

[1-1-2. Configuration of Interchangeable Lens]

Interchangeable lens 301 has an optical system including focus lens 310, correction lens 318, and zoom lens 312. Interchangeable lens 301 is further equipped with lens controller 320, lens mount 330, focus lens driver 311, zoom lens driver 313, diaphragm 316, iris driver 317, operation ring 315, optical image stabilizer (OIS) driver 319, dynamic random access memory (DRAM) 321, flash memory 322, and the like.

Lens controller 320 controls an operation of whole interchangeable lens 301. Lens controller 320 can receive an operation of a user on operation ring 315 to perform control such that zoom lens driver 313 drives zoom lens 312. Lens controller 320 can control focus lens driver 311, OIS driver 319, and iris driver 317 respectively so that focus lens 310, correction lens 318, and diaphragm 316 are driven.

OIS driver 319 is equipped with a drive mechanism configured with, for example, a magnet and a flat coil. OIS driver 319 controls the drive mechanism, on the basis of a detection signal of a gyro sensor for detecting shake of interchangeable lens 301, so that the drive mechanism shifts correction lens 318 in a plane perpendicular to an optical axis of the optical system, depending on the shake of interchangeable lens 301. This operation reduces an influence, to a picked-up image, of the shake due to hand shake.

Lens controller 320 is connected to DRAM 321 and flash memory 322 and can write and read information to and from these memories. Further, lens controller 320 can communicate with controller 130 through lens mount 330. Note that lens controller 320 may be configured with a hard-wired electronic circuit or configured with a microcomputer using a program or other devices.

Lens mount 330 is connected to body mount 340 of camera body 102 to mechanically and electrically connect interchangeable lens 301 and camera body 102. When interchangeable lens 301 and camera body 102 are connected, lens controller 320 and controller 130 can communicate with each other. Body mount 340 can transmit to controller 130 in camera body 102 a signal received from lens controller 320 through lens mount 330.

[1-1-3. Configuration of Camera Body]

Camera body 102 includes charge coupled device (CCD) image sensor 143 and analog front end (AFE) 144.

CCD image sensor 143 picks up a subject image formed through interchangeable lens 301 to generate image information. Note that image sensors of other types, for example, complementary metal oxide semiconductor (CMOS) image sensor may be used as the image sensor.

On the image information read out from CCD image sensor 143, AFE 144 performs noise suppression by a correlated double sampling, amplification to an input range of an A/D converter by an analog gain controller, and A/D conversion by the A/D converter.

Camera body 102 is further equipped with sound input unit 111 and analog sound processor 115. Sound input unit 111 includes two main microphones (main microphone 111R and main microphone 111L) for separately collecting main sound (sound to be recorded) from each of the right and left directions. Note that, in the first exemplary embodiment, an example of a first direction is the left direction, and an example of a second direction is the right direction. Further, a first main microphone is main microphone 111R, and a second main microphone is main microphone 111L.

Sound input unit 111 further includes reference microphone 111N which acquires information of noise in the inside of camera body 102. That is, reference microphone 111N acquires at least one of the noise due to vibration of camera body 102 and various noises generated in the inside of camera body 102. Information acquired by reference microphone 111N is used to generate a signal (noise component) for suppressing noise contained in the main sound.

The microphones (main microphone 111R, main microphone 111L, and reference microphone 111N) convert sound signals into electric signals (analog sound signals). The analog sound signals from the microphones (main microphone 111R, main microphone 111L, and reference microphone 111N) are input into analog sound processor 115.

Analog sound processor 115 performs a predetermined signal processing on the analog sound signals. Analog sound processor 115 converts the processed analog sound signals into digital sound signals by the A/D converter and outputs the digital sound signals to digital image and sound processor 120. Analog sound processor 115 is an example of a sound signal processor. Analog sound processor 115 is configured with an electronic circuit including an analog circuit and is configured with one or more semiconductor integrated circuits. Analog sound processor 115 has an automatic level control (ALC) function. The automatic level control function automatically controls a gain so that a level of an output digital sound signal does not exceed a predetermined upper limit threshold regardless of a level of the input analog sound signal.

Digital image and sound processor 120 performs various processes on the image information output from AFE 144 and the sound signal output from analog sound processor 115. For example, digital image and sound processor 120 performs gamma correction, white balance correction, defect correction, a coding process, and the like on the image information, following instructions from controller 130. Digital image and sound processor 120 further performs various processes on the sound signal, following instructions form controller 130. Digital image and sound processor 120 may be realized by a hard-wired electronic circuit or realized by a microcomputer or the like which performs a program. Digital image and sound processor 120 may also be realized as a single semiconductor chip together with controller 130 and the like. For example, digital image and sound processor 120 can be configured with a CPU (Central Processing Unit), an FPGA (Field-Programmable Gate Array), an ASIC (Application Specific Integrated Circuit), a DSP (Digital Signal Processor), or the like.

Digital image and sound processor 120 perform a directivity synthesis process and a noise suppression process by performing arithmetic processing on the sound signal, which is outputted from sound input unit 111. A circuit realizing digital image and sound processor 120 may be integrated into one or more semiconductor integrated circuits.

Display 190 is disposed on a back surface of digital camera 100. Display 190 can be configured with a liquid crystal display or an organic EL display. Display 190 displays an image based on the image information processed by digital image and sound processor 120.

Controller 130 integrally controls the operation of whole digital camera 100. Controller 130 may be realized by a hard-wired electronic circuit or realized by a microcomputer executing a program or other devices. Alternatively, controller 130 may be integrally realized as a single semiconductor chip with digital image and sound processor 120 and the like. Further, read only memory (ROM) 170 does not need to be located on the outside of controller 130 (as a body separate from controller 130) and may be embedded in controller 130. For example, controller 130 may be configured with a CPU, an FPGA, an ASIC, a DSP, or the like.

ROM 170 stores programs, to be executed by controller 130, including programs for automatic focus (AF) control, automatic exposure (AE) control, light emission control of an electronic flash, and the like, in addition, including a program for integral control of the operation of whole digital camera 100. ROM 170 stores various conditions and settings about digital camera 100. Note that, in the first exemplary embodiment, ROM 170 is a flash ROM.

Random access memory (RAM) 150 functions as a working memory for digital image and sound processor 120 and controller 130. RAM 150 can be realized by an SDRAM (Synchronous Dynamic Random Access Memory), a flash memory, or the like. RAM 150 also functions as an internal memory for storing image information, a sound signal, and the like.

External storage medium 160 is a memory device equipped, in the memory device, with a non-volatile storage device such as a flash memory. External storage medium 160 is detachable to camera body 102. External storage medium 160 stores the data of the image and the sound processed by digital image and sound processor 120, according to the control of controller 130.

Operation unit 180 is a collective term of an operation interface including an operation button, an operation dial, and the like disposed on an outer case of digital camera 100. Operation unit 180 receives an operation by a user. For example, operation unit 180 includes a shutter-release button, a power switch, and a mode dial provided on an upper surface of digital camera 100 and a center button, a cross button, a touch panel, and the like provided on a back surface of digital camera 100. Upon receiving an operation by a user, operation unit 180 notifies controller 130 of signals instructing various operations.

Further, camera body 102 reduces an influence, on a picked-up image, of the shake due to hand shake by shifting CCD 143, depending on the shake of camera body 102. As a component for realizing this function, camera body 102 is equipped with body image stabilizer (BIS) driver 181 which shifts CCD 143 on the basis of the shake of camera body 102. BIS driver 181 includes a drive mechanism configured with, for example, a magnet and a flat coil. BIS driver 181 performs control of the drive mechanism on the basis of signals from a gyro sensor and a position sensor such that the drive mechanism shifts CCD 143 in a plane perpendicular to the optical axis so as to cancel the shake of camera body 102.

[1-1-4. Configuration of Microphones]

Figure 2A:
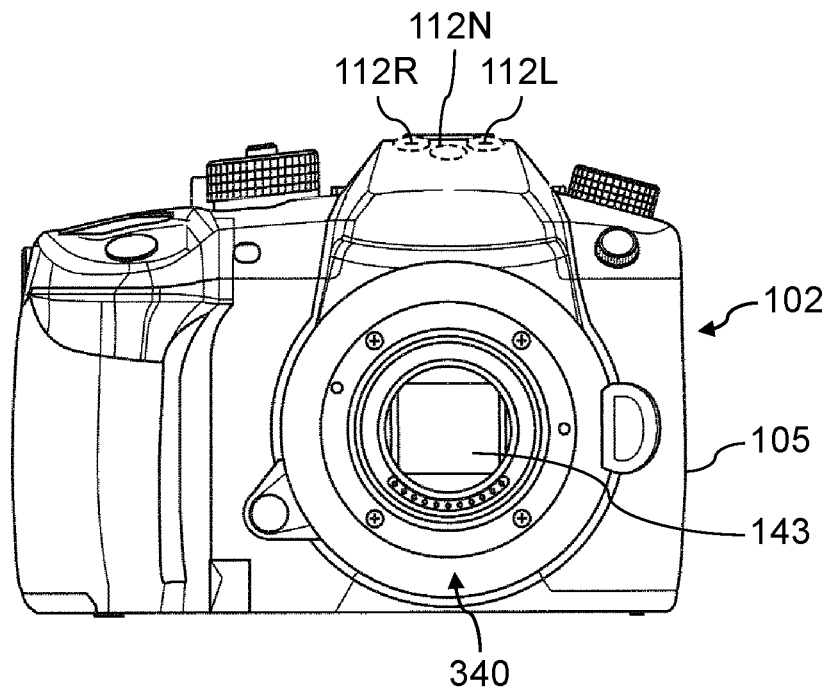
FIG. 2A is a diagram showing positions of a main microphone and a reference microphone in the imaging device of the present disclosure.
Figure 2B:
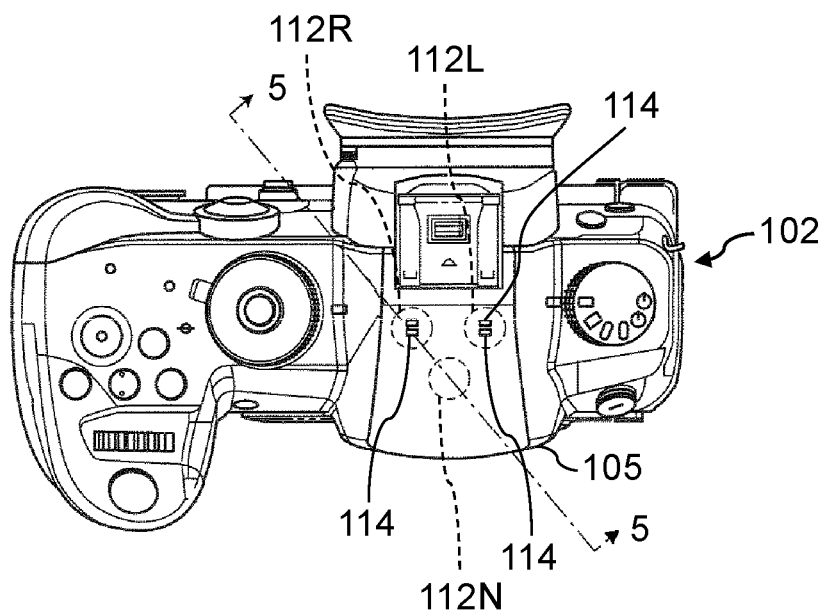
FIG. 2B is a diagram showing the positions of the main microphone and the reference microphone in the imaging device of the present disclosure.

Main microphone 111R, main microphone 111L, and reference microphone 111N are disposed in the inside of camera body 102 as shown in FIG. 2A and FIG. 2B. The positions and the detailed arrangement configuration of main microphone 111R, main microphone 111L, and reference microphone 111N in camera body 102 will be described later. The configuration of main microphone 111R is described below. Because the configurations of main microphone 111L and reference microphone 111N are similar to that of main microphone 111R, the description is omitted.

Figure 3:
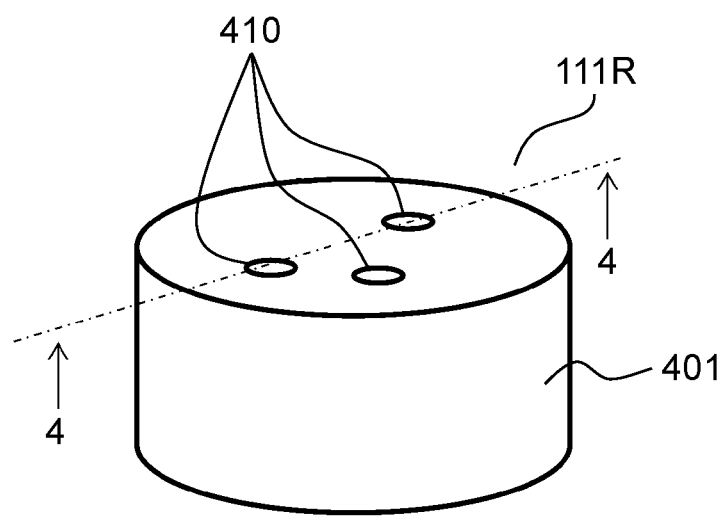
FIG. 3 is a perspective view of a configuration of the main microphone of the present disclosure.
Figure 4:
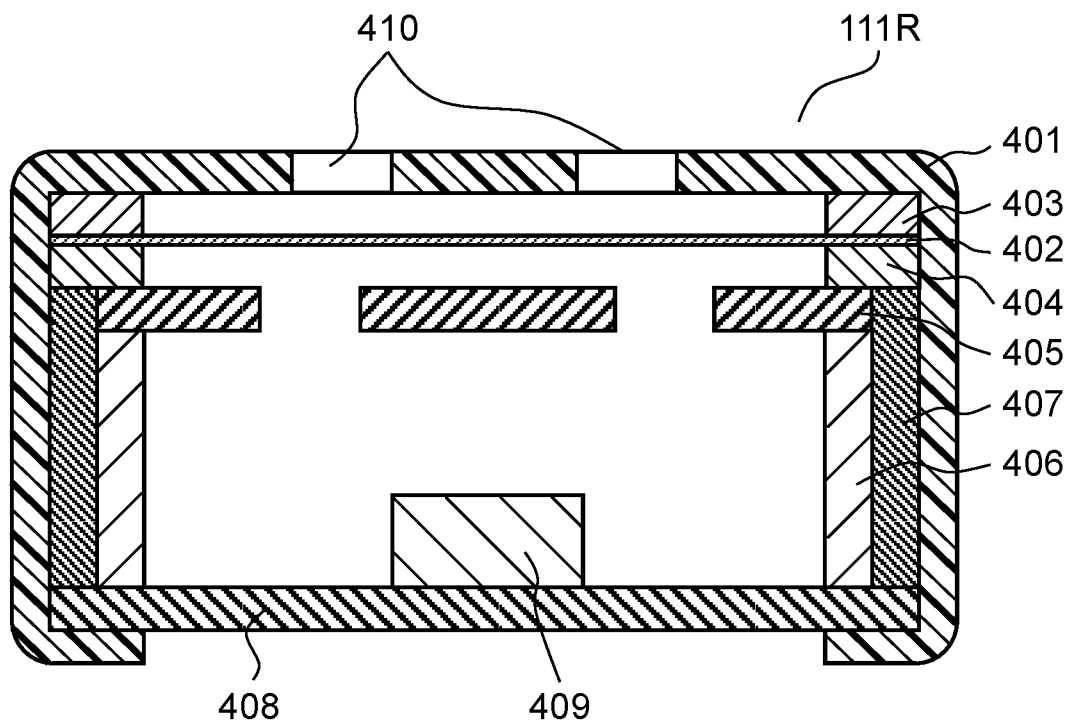
FIG. 4 is a diagram schematically showing a cross-section of the main microphone taken along line 4-4 in FIG. 3.

Main microphone 111R has a columnar shape as shown in FIG. 3. As shown in FIG. 4, main microphone 111R is equipped with case 401, diaphragm 402, diaphragm ring 403, spacer 404, back electrode plate 405, electrode 406, insulator 407, printed circuit board 408, and field effect transistor (FET) 409.

Case 401 constitutes a part of an outer case of main microphone 111R. In the surface, of case 401, opposite to the side of printed circuit board 408, sound holes 410 are formed. Case 401 is made of metal. In particular, case 401 is made of SUS (Steel Use Stainless), aluminum, or the like.

Diaphragm 402 has a disk shape. Diaphragm 402 is a thin film which is made of polymer material such as polyester terephthalate (PET) and has a thickness of several microns to several tens of microns and the surface of which is coated with metal such as gold or nickel by a sputtering method or a vapor deposition method. Diaphragm 402 is disposed in the inside of case 401. Diaphragm 402 is bonded to ring-shaped diaphragm ring 403 and is tightly stretched like a drum-skin. A material of diaphragm ring 403 is metal, for example, SUS or brass. Being in contact with case 401, diaphragm 402 and diaphragm ring 403 has the same potential as that of case 401.

Spacer 404 has a ring shape. Spacer 404 has a thickness of approximately several microns to several tens of microns. A material of spacer 404 is insulating material such as polyimide.

Back electrode plate 405 has a disk shape. Back electrode plate 405 is a plate in which a base material made of metal such as SUS or brass is coated with electret material such as FEP (tetrafluoroethylene-hexafluoropropylene copolymer). The electret material is polymer material which holds electric charge semi-permanently. With this configuration, back electrode plate 405 holds an electric charge. Back electrode plate 405 has a few holes to let air pass through. Back electrode plate 405 is opposed to diaphragm 402 with spacer 404 disposed between back electrode plate and diaphragm 402. That is, a distance between back electrode plate 405 and diaphragm 402 is almost the same as a thickness of spacer 404.

Electrode 406 has, for example, a pipe shape, in other words, a cylindrical shape. Electrode 406 is disposed between back electrode plate 405 and printed circuit board 408. Electrode 406 electrically connects back electrode plate 405 and printed circuit board 408.

Insulator 407 has a pipe shape, for example. Insulator 407 is disposed between back electrode plate 405 and electrode 406, and case 401. Insulator 407 prevents back electrode plate 405 and electrode 406 from being electrically conducted to case 401.

Printed circuit board 408 constitutes a part of the outer case of main microphone 111R. Printed circuit board 408 is electrically connected to back electrode plate 405 through electrode 406. Further, on printed circuit board 408, chip components such as FET 409 are surface-mounted. On an outer side of printed circuit board 408, in other words, on the lower surface side on the plane of FIG. 4, a terminal is provided. Through the terminal, an electric output of main microphone 111R can be taken out.

Note that one end of case 401 is swaged to be turned around to the lower side of printed circuit board 408. Specifically, the one end of case 401 seals between printed circuit board 408 and case 401 so as not to allow a gap to exist. Further, the one end of case 401 electrically connects the case 401 and printed circuit board 408.

Hereinafter, the operations of main microphone 111R, main microphone 111L, and reference microphone 111N will be described.

Here, sound is a compressional wave of air and a pressure fluctuation of air. When sound passes through sound holes 410 and reaches diaphragm 402, diaphragm 402 receives pressure. Diaphragm 402 is displaced depending on the pressure. That is, the distance d between diaphragm 402 and back electrode plate 405 changes. The amount of the change is represented by $\Delta d$. Further, an area of diaphragm 402 is represented by S. Further, the amount of the electric charge held by back electrode plate 405 is represented by Q. Opposing diaphragm 402 and back electrode plate 405 form a capacitor. When the capacitance of the capacitor is represented by C and the permittivity is represented by $\varepsilon$, the following Equation 1 is held:

$$C = \varepsilon \frac{S}{d} \quad \text{Equation 1}$$

Further, when the potential between diaphragm 402 and back electrode plate 405 is represented by V, the following Equation 2 is held according to Coulomb's law:

$$V = \frac{Q}{C} \quad \text{Equation 2}$$

Based on the above Equation 1 and Equation 2, the following Equation 3 is held:

$$V = \frac{Qd}{\varepsilon S} \quad \text{Equation 3}$$

The following Equation 4 represents the change $\Delta V$ in the potential when diaphragm 402 is displaced by sound, and the distance between diaphragm 402 and back electrode plate 405 thus changes by $\Delta d$:

$$\Delta V = \frac{Q \Delta d}{\varepsilon S} \quad \text{Equation 4}$$

Equation 4 shows that the displacement of diaphragm 402 can be taken out as the change in potential.

Note that the capacitor formed with diaphragm 402 and back electrode plate 405 has a capacitance C of several picofarads to several tens of picofarads and has a high impedance. Therefore, FET 409 mounted on printed circuit board 408 is used to convert the impedance.

[1-1-5. Arrangement of Microphones]

FIG. 2A and FIG. 2B are diagrams showing the positions of main microphone 111R, main microphone 111L, and reference microphone 111N in digital camera 100. Main microphone 111R, main microphone 111L, and reference microphone 111N are disposed in a region on the upper part of camera body 102 in the inside of case 105, in other words, in the inside of camera body 102. The region in which main microphone 111R is disposed is area 112R represented by the dotted line. The region in which main microphone 111L is disposed is area 112L. The region in which reference microphone 111N is disposed is area 112N.

Main microphone 111L and main microphone 111R are arranged in the longitudinal direction of camera body 102 at a predetermined interval (for example, approximately 15 mm). The longitudinal direction of camera body 102 is the right and left direction on the plane of FIG. 2A.

Reference microphone 111N is disposed in the vicinity of main microphone 111R and main microphone 111L. Further, reference microphone 111N is disposed at a position equally distant from each of main microphone 111R and main microphone 111L. With this arrangement, it is possible to perform the noise suppression process on main sound signals of the right and left channels by using one reference microphone 111N. Specifically, reference microphone 111N is disposed at a position which is not less than 5 mm to not more than 50 mm (for example, 10 mm) distant from each of main microphone 111R and main microphone 111L.

Figure 5:
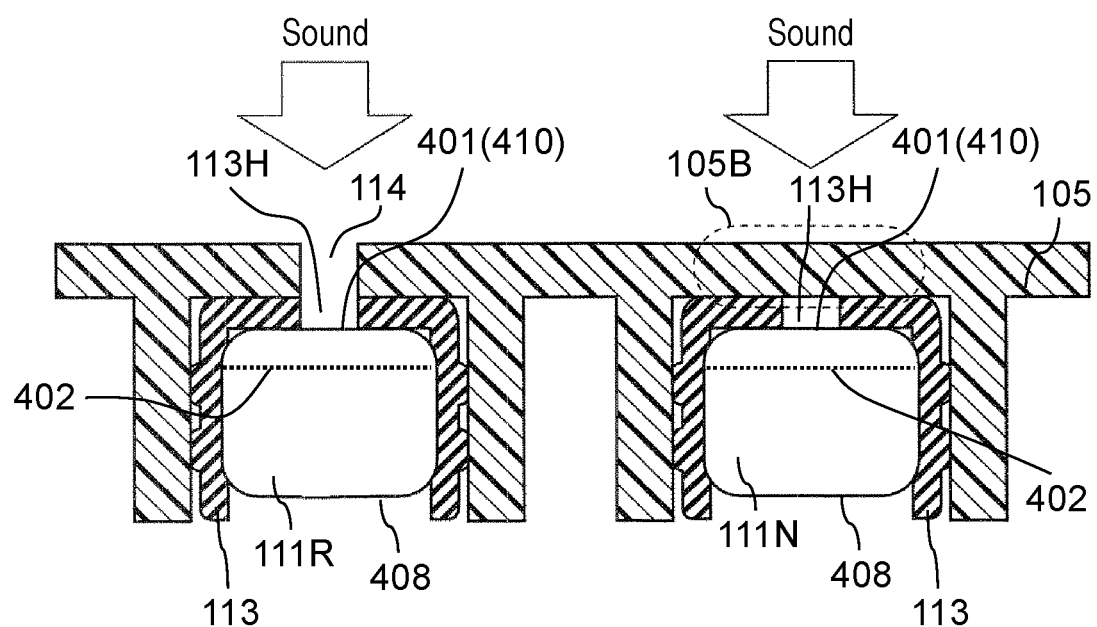
FIG. 5 is a diagram illustrating an arrangement configuration of the main microphone and the reference microphone of the present disclosure.

FIG. 5 is a diagram illustrating an arrangement configuration of main microphone 111R and reference microphone 111N in the inside of camera body 102. FIG. 5 schematically shows the cross-section taken along line 5-5 of FIG. 2B. Further, although FIG. 5 shows only main microphone 111R, main microphone 111L is disposed similarly to main microphone 111R.

As shown in FIG. 5, an outer circumference of main microphone 111R is covered with rubber member 113, which is a fixing member. Rubber member 113 has a cylindrical shape having an end face. One end of rubber member 113 on the opposite side of the end face has an opening, and main microphone 111R is inserted from this one end. The other end (the end face) of rubber member 113 covers a surface of case 401 of main microphone 111R. The end face of rubber member 113 has a sound hole (opening) 113H. Main microphone 111R and main microphone 111L are pressure-inserted into recessed portions of case 105 by elastically deforming rubber members 113 and are fixed in the inside of camera body 102. Note that, in the first exemplary embodiment, main microphone 111R and main microphone 111L are disposed such that the surfaces, having sound holes 410, of case 401 are directed to the outside (the upper side on the plane of FIG. 5) and printed circuit boards 408 are directed to the inside of camera body 102 (the lower side on the plane of FIG. 5).

Similarly, in camera body 102, reference microphone 111N is also fixed on the inside of the recessed portion of case 105 with rubber member 113. Further, reference microphone 111N is disposed in the same direction as main microphone 111R and main microphone 111L. In other words, reference microphone 111N is disposed such that the surface, having sound holes 410, of case 401 is directed to the outside and printed circuit board 408 is directed to the inside of camera body 102. The arrangement that reference microphone 111N, main microphone 111R, and main microphone 111L are directed to the same direction means that the directions in which reference microphone 111N, main microphone 111R, and main microphone 111L collect sound are the same, in other words, that the direction in which each diaphragm 402 receives sound pressure is the same direction.

As shown in FIG. 2B and FIG. 5, in area 112R in which main microphone 111R is mounted in case 105, there are provided sound holes (openings) 114 in case 105. Through these sound holes 114 of case 105, sound hole 113H of rubber member 113, and sound holes 410 of main microphone 111R, sound pressure due to sound (vibration of air) is transmitted to diaphragm 402 of main microphone 111R. Similarly, sound holes 114 are formed also in area 112L of case 105. Through these sound holes 114, sound hole 113H of rubber member 113, and sound holes 410 of main microphone 111L, sound pressure due to sound is transmitted to diaphragm 402 of main microphone 111L.

As shown in FIG. 2B, two sound holes 114 are provided for each of main microphone 111R and main microphone 111L in the first exemplary embodiment; however, only one sound hole 114 may be provided for each of main microphone 111R and main microphone 111L. However, in the case that the number of sound holes 114 is more than one, if the function of a part of sound holes 114 is lost, the other sound holes 114 can complement the lost function. For example, if a part of sound holes 114 is lost by, for example, being picked by a user or if a part of sound hole 114 is stuck with dust or a water droplet, the other sound holes 114 can complement the lost function.

Further, in the first exemplary embodiment, as shown in FIG. 5, the inside of main microphone 111R and the inside space of case 105 are separated with printed circuit board 408 of main microphone 111R. That is, printed circuit board 408 makes it difficult for the sound pressure due to the sound in the inside of case 105 to be transmitted to diaphragm 402. Similarly, the inside of main microphone 111L and the inside of case 105 are separated with printed circuit board 408 of main microphone 111L. As described above, in the first exemplary embodiment, printed circuit boards 408 of main microphone 111R and main microphone 111L correspond to a first shield of the present disclosure.

On the other hand, in the first exemplary embodiment, as shown in FIG. 2B and FIG. 5, case 105 has no sound hole 114 formed in area 112N which corresponds to a position at which reference microphone 111N is mounted. That is, one part 105B of case 105 blocks the sound pressure being transmitted from the outside of camera body 102 to the inside of reference microphone 111N. In other words, one part 105B of case 105 functions as a shield (second shield) which blocks the sound pressure being transmitted from the outside of camera body 102 to the inside of reference microphone 111N. With this arrangement, sound (vibration of air) is not transmitted from the outside of camera body 102 to reference microphone 111N.

Thus, the inside of reference microphone 111N and the inside of case 105 are separated by printed circuit board 408 of reference microphone 111N. That is, in the first exemplary embodiment, printed circuit board 408 of reference microphone 111N corresponds to a third shield of the present disclosure. Here, noise (vibration) in the inside of camera body 102 is transmitted through case 105 and rubber member 113, but there is no place for the noise to escape because there is no sound hole 114 formed in one part 105B of case 105; therefore, the noise is finally transmitted to reference microphone 111N. Thus, the noise in the inside of case 105 is transmitted to reference microphone 111N more easily than to main microphone 111R and main microphone 111L. Note that it can be thought that if sound hole 114 is provided in the one part 105B of case 105, an external sound, which is to be collected, also enters reference microphone 111N, so that it is difficult to suppress only the noise by a noise suppressor on the later stage.

[1-2. Operation of Sound Pick-Up Device]

A description will be given on the noise suppression process, on a sound signal, performed on digital image and sound processor 120 of digital camera 100. Digital image and sound processor 120 performs the noise suppression process on the basis of the signal which is input from reference microphone 111N.

Each of main microphone 111R and main microphone 111L acquires main sound on the outside of digital camera 100 and converts the main sound into an electric signal (hereinafter, referred to as a "main sound signal") as a first sound signal. Reference microphone 111N acquires noise in the inside of digital camera 100 and converts the noise into an electric signal (hereinafter, referred to as a "noise signal") as a second sound signal.

Analog sound processor 115 acquires the main sound signals from main microphone 111R and main microphone 111L, acquires the noise signal from reference microphone 111N, performs a predetermined process on the main sound signals and the noise signal, and outputs the processed signals to digital image and sound processor 120. Digital image and sound processor 120 performs filtering processing on the noise signal to generate a noise component and subtracts the noise component from the main sound signals. By this operation, digital image and sound processor 120 generates sound signals in which the noise is suppressed.

Figure 6:
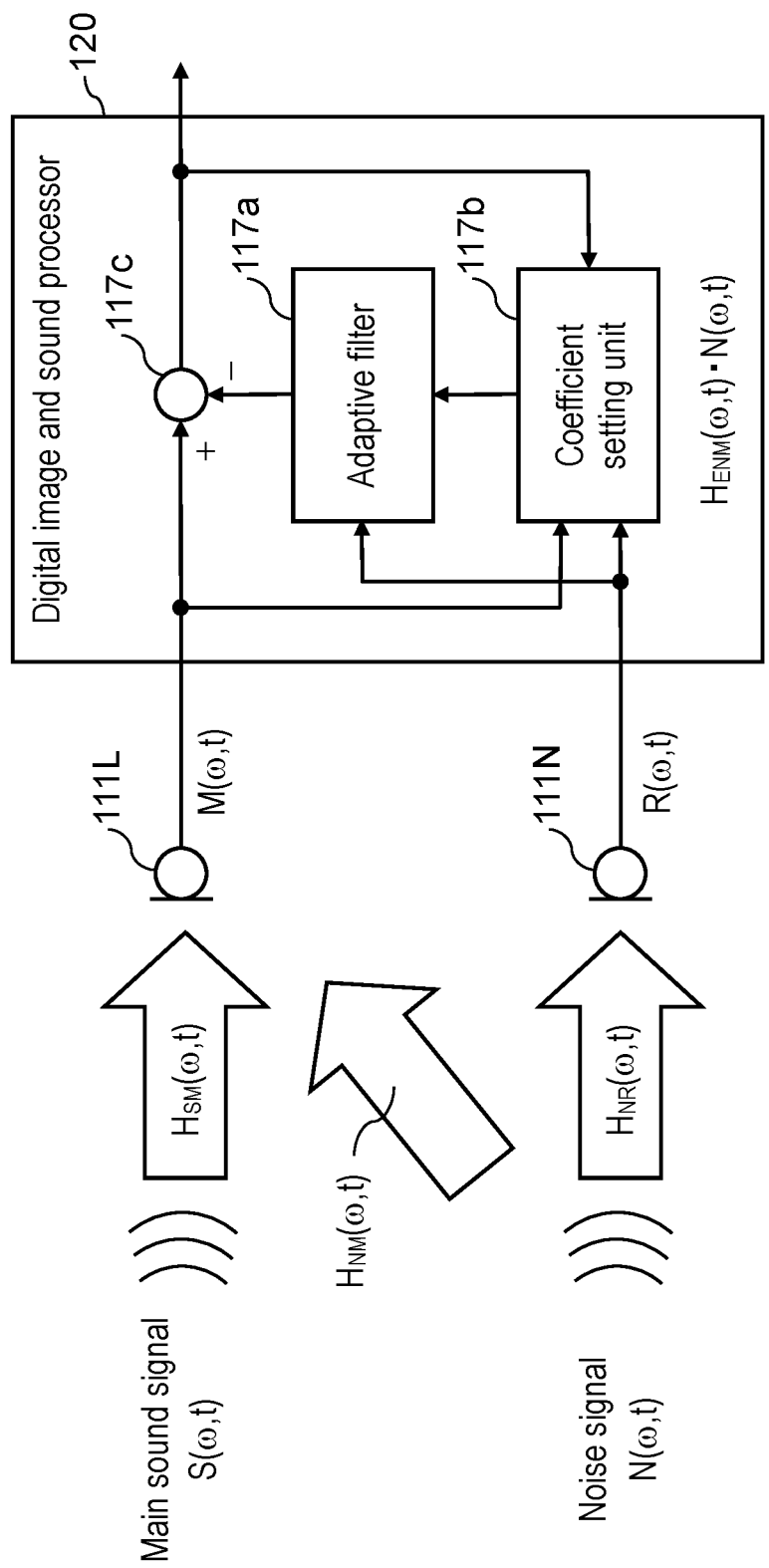
FIG. 6 is a diagram illustrating a configuration related to a noise suppression function on a digital image and sound processor.

FIG. 6 is diagram showing a main configuration to realize the noise suppression process for the sound signal on digital image and sound processor 120. For the sake of convenience, FIG. 6 shows the configuration for the sound signal from one microphone (main microphone 111L) of the two main microphones 111R and 111L respectively on the right and the left. Specifically, digital image and sound processor 120 has the configuration shown in FIG. 6 for each channel.

Hereinafter, a description will be given on the configuration and the operation of the noise suppression for the sound signal from the microphone (main microphone 111L) of one channel; however, regarding the microphone (main microphone 111R) of the other channel, the configuration and the operation are the same.

Digital image and sound processor 120 is equipped with adaptive filter 117a, coefficient setting unit 117b, and subtractor 117c.

Coefficient setting unit 117b sets a filter coefficient of adaptive filter 117a, according to the noise signal and the like. Depending on the filter coefficient set by coefficient setting unit 117b, adaptive filter 117a filters the output signal (noise signal) from reference microphone 111N to generate the noise component which is assumed to be included in the sound signal (main sound signal) collected by main microphone 111L. Subtractor 117c subtracts the noise component having been output from adaptive filter 117a from the sound signal (main sound signal) collected by main microphone 111L. This operation generates the sound signal in which noise is suppressed.

In FIG. 6, a transfer function related to the noise suppression function in digital image and sound processor 120 is defined below. The main sound signal acquired by each of main microphone 111R and main microphone 111L is $S(\omega,t)$, and the noise signal acquired by reference microphone 111N is defined as $N(\omega,t)$. The noise signal includes the signals due to various noises generated in camera body 102. For example, the noise represented by the noise signal includes the driving sound and the like of the drive mechanism when BIS driver 181 drives CCD 143.

The transfer function of each of main microphone 111R and main microphone 111L with respect to the main sound signal $S(\omega,t)$ is defined as $H_{SM}(\omega,t)$. A transfer function of each of main microphone 111R and main microphone 111L with respect to a noise signal $N(\omega,t)$ is defined as $H_{NM}(\omega,t)$. The transfer function of reference microphone 111N with respect to the noise signal $N(\omega,t)$ is defined as $H_{NR}(\omega, t)$. With the above definitions, an output signal $M(\omega,t)$ of each of main microphone 111R and main microphone 111L and an output signal $R(\omega,t)$ of reference microphone 111N are respectively obtained by following Equation 5 and Equation 6:

$$M(\omega,t)=H_{SM}(\omega,t)\cdot S(\omega,t)+H_{NM}(\omega,t)\cdot N(\omega,t) \quad \text{Equation 5}$$

$$R(\omega,t)=H_{NR}(\omega,t)\cdot N(\omega,t) \quad \text{Equation 6}$$

Here, a signal component contained in the output signal $R(\omega,t)$ of reference microphone 111N is supposed to be negligibly small compared with the main sound signal.

A noise component in the output signal $M(\omega,t)$ of each of main microphone 111R and main microphone 111L is expressed by $H_{NM}(\omega,t)\cdot N(\omega,t)$. Therefore, by estimating the value of $H_{NM}(\omega,t)\cdot N(\omega,t)$ and subtracting the noise component from the output signal $M(\omega,t)$, it is possible to obtain a sound signal in which the noise is suppressed.

Therefore, in digital image and sound processor 120, coefficient setting unit 117b acquires the output signal $M(\omega,t)$ of each of main microphone 111R and main microphone 111L and the output signal $R(\omega,t)$ of reference microphone 111N, compares the signals to estimate the noise component, and sets the filter coefficient of adaptive filter 117a, according to an estimated noise component ($H_{ENM}(\omega,t)\cdot N(\omega,t)$). Adaptive filter 117a generates the noise component ($H_{ENM}(\omega,t)\cdot N(\omega,t)$) from the output signal $R(\omega,t)$ and outputs the noise component. Subtractor 117c subtracts the output signal ($H_{ENM}(\omega,t)\cdot N(\omega,t)$) of adaptive filter 117a from the output signal $M(\omega,t)$. By this operation, analog sound processor 115 outputs the sound signal in which the noise is suppressed.

[1-3. Modified Example of Arrangement of Microphones]

In the first exemplary embodiment, reference microphone 111N is disposed as shown in FIG. 5; however, other various arrangement configurations can be considered. Hereinafter, modified examples of the first exemplary embodiment will be described with reference to FIG. 7 to FIG. 11. FIG. 12 is a diagram showing a comparison table among the arrangement configurations of the reference microphone of the first exemplary embodiment shown in FIG. 5 and the following modified examples. Note that, because the arrangement configuration of main microphone 111R (main microphone 111L) in the following modified examples are the same as in FIG. 5, main microphone 111R (main microphone 111L) is not described.

First Modified Example

Figure 7:
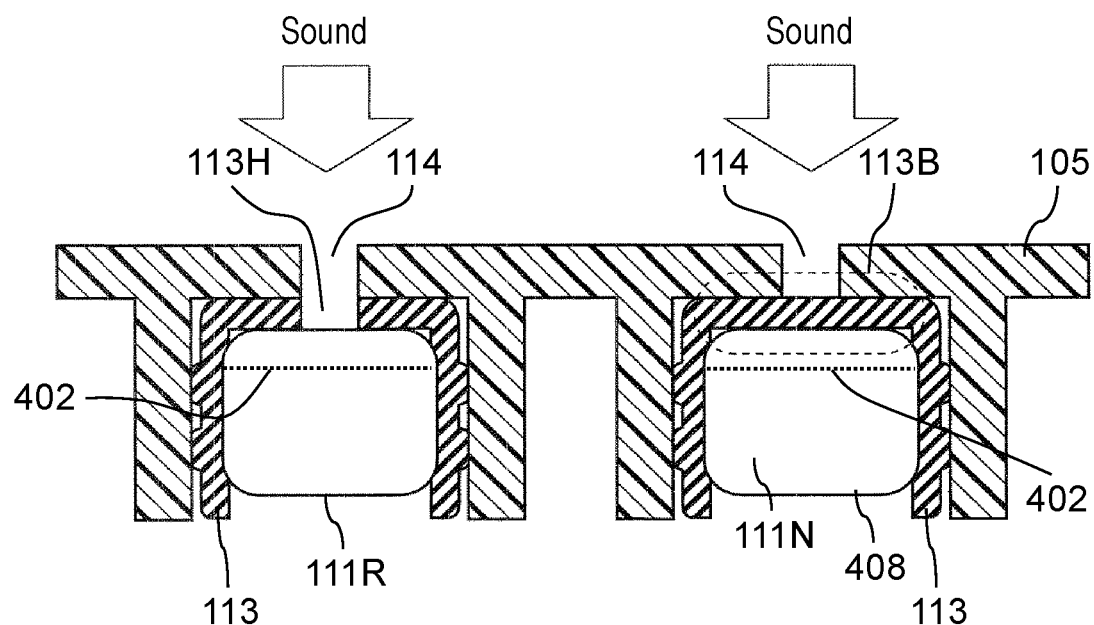
FIG. 7 is a diagram showing an arrangement configuration of a main microphone and a reference microphone of a first modified example of the present disclosure.

In the first modified example, as shown in FIG. 7, rubber member 113 for fixing reference microphone 111N does not have sound hole 113H. Further, on the plane of FIG. 7, case 105 has sound hole 114 formed above reference microphone 111N. In this case, one part 113B of rubber member 113 blocks between the outside of case 105 and the inside of reference microphone 111N. Further, printed circuit board 408 of reference microphone 111N blocks between the inside of case 105 and the inside of reference microphone 111N.

That is, in the first modified example, rubber member 113 corresponds to the second shield, and printed circuit board 408 corresponds to the third shield.

With this arrangement configuration, even though sound hole 114 is formed in case 105, the noise component can be suppressed similarly to the first exemplary embodiment.

Second Modified Example

Figure 8:
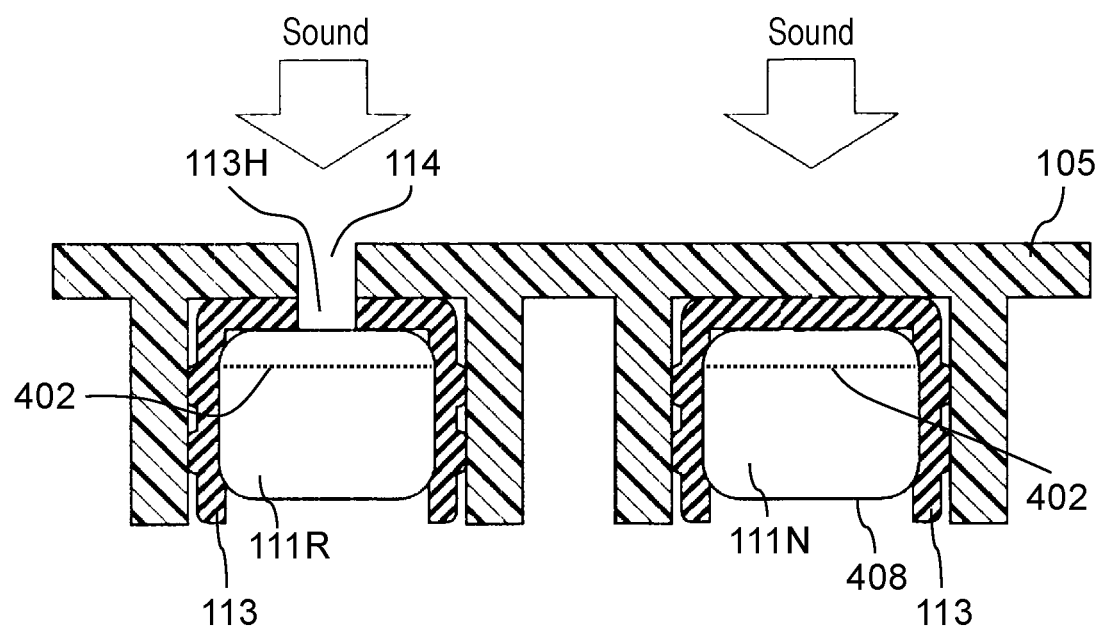
FIG. 8 is a diagram showing an arrangement configuration of a main microphone and a reference microphone in a second modified example of the present disclosure.

In the second modified example, as shown in FIG. 8, rubber member 113 for fixing reference microphone 111N does not have sound hole 113H. Further, above reference microphone 111N, sound hole 114 is not formed in case 105. In this case, case 105 and rubber member 113 block between the outside of case 105 and the inside of reference microphone 111N. Further, printed circuit board 408 of reference microphone 111N blocks between the inside of case 105 and the inside of reference microphone 111N.

That is, in the second modified example, case 105 and rubber member 113 correspond to the second shield, and printed circuit board 408 corresponds to the third shield.

Third Modified Example

Figure 9:
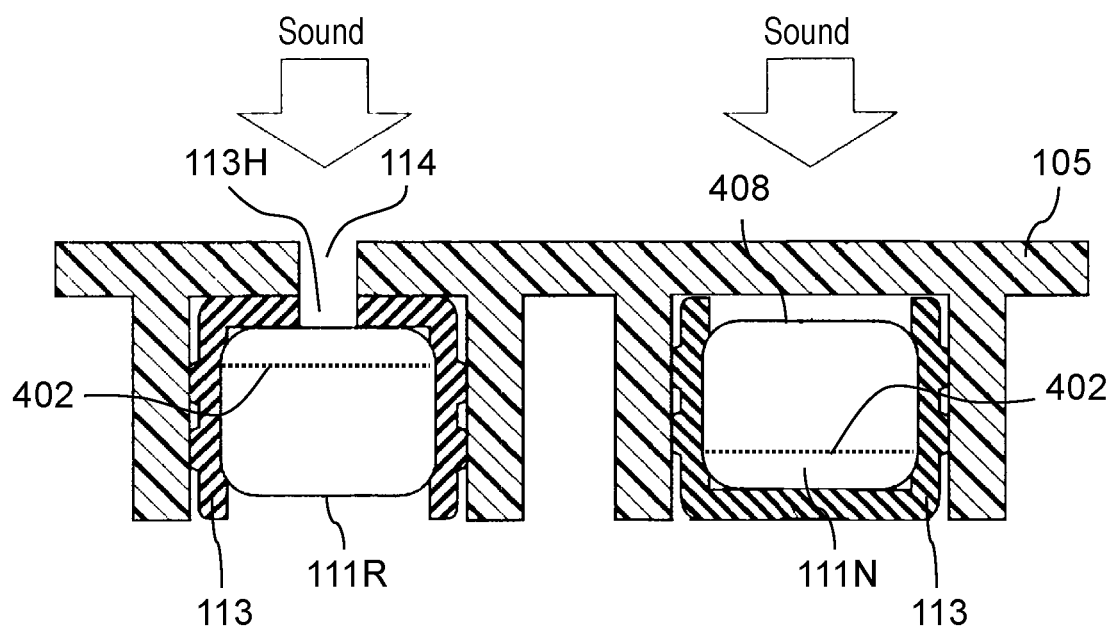
FIG. 9 is a diagram showing an arrangement configuration of a main microphone and a reference microphone in a third modified example of the present disclosure.

In third modified example, as shown FIG. 9, reference microphone 111N is disposed in the direction which is turned by 180 degrees from the direction of main microphone 111R. That is, right under case 105, printed circuit board 408 of reference microphone 111N is disposed. Further, in the third modified example, rubber member 113 for fixing reference microphone 111N does not have sound hole 113H formed. Further, above reference microphone 111N, sound hole 114 is not formed in case 105. In this case, case 105 and printed circuit board 408 block the outside of case 105 and the inside of reference microphone 111N. In this configuration, rubber member 113 blocks between the inside of case 105 and the inside of reference microphone 111N.

That is, in the third modified example, case 105 and printed circuit board 408 correspond to the second shield, and rubber member 113 corresponds to the third shield.

Fourth Modified Example

Figure 10:
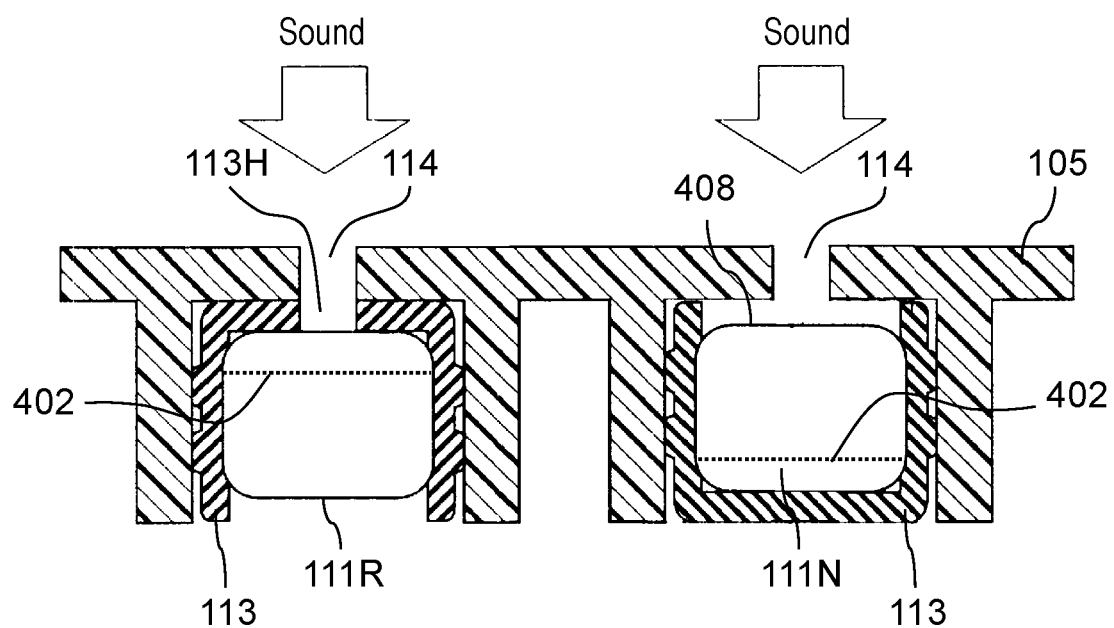
FIG. 10 is a diagram showing an arrangement configuration of a main microphone and a reference microphone in a fourth modified example of the present disclosure.

In the fourth modified example, as shown in FIG. 10, reference microphone 111N is disposed in the direction which is turned by 180 degrees from the direction of main microphone 111R. That is, right below case 105, printed circuit board 408 of reference microphone 111N is disposed. Further, in the fourth modified example, rubber member 113 for fixing reference microphone 111N does not have sound hole 113H formed. Above reference microphone 111N, sound hole 114 is formed in case 105. In this case, printed circuit board 408 blocks between the outside of case 105 and the inside of reference microphone 111N. In this configuration, rubber member 113 blocks between the inside of case 105 and the inside of reference microphone 111N.

That is, in the fourth modified example, printed circuit board 408 corresponds to the second shield, and rubber member 113 corresponds to the third shield.

Fifth Modified Example

Figure 11:
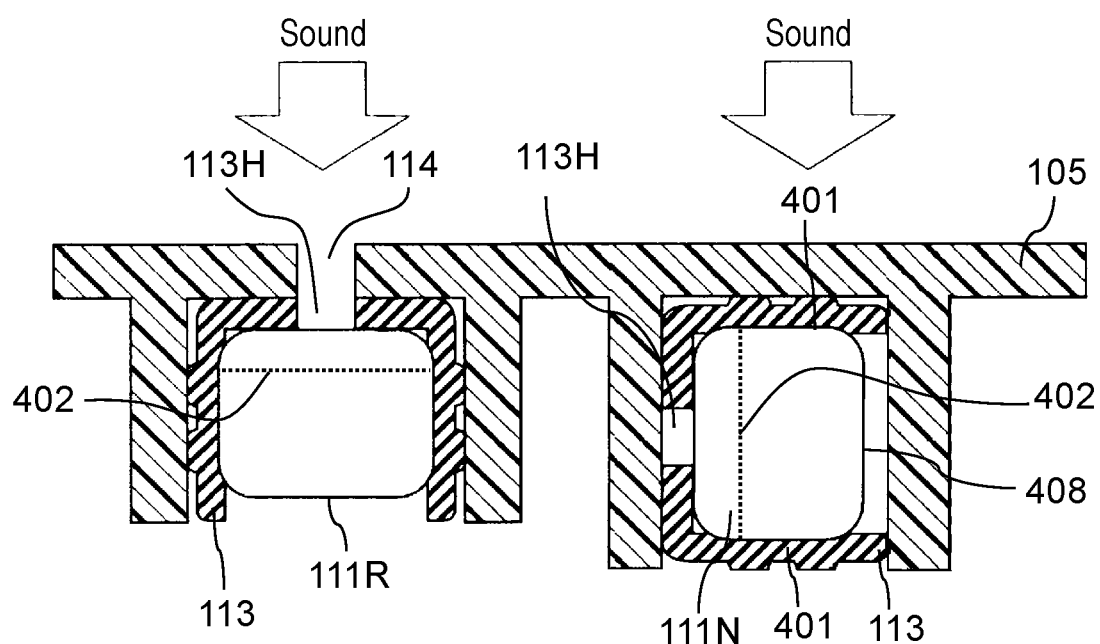
FIG. 11 is a diagram showing an arrangement configuration of a main microphone and a reference microphone in a fifth modified example of the present disclosure.

In the fifth modified example, as shown in FIG. 11, reference microphone 111N is disposed in the direction which is turned by 90 degrees from the direction of main microphone 111R. Further, in the fifth modified example, sound hole 113H is formed in rubber member 113. Further, above reference microphone 111N, sound hole 114 is not formed in case 105. In this case, case 105, rubber member 113, and case 401 of reference microphone 111N block between the outside of case 105 and the inside of reference microphone 111N. In this configuration, rubber member 113 and case 401 of reference microphone 111N block between the inside of case 105 and the inside of reference microphone 111N.

That is, in the fourth modified example, case 105, rubber member 113, and case 401 of reference microphone 111N correspond to the second shield, and rubber member 113 and case 401 of reference microphone 111N correspond to the third shield.

[1-4. Experimental Result]

Figure 13:
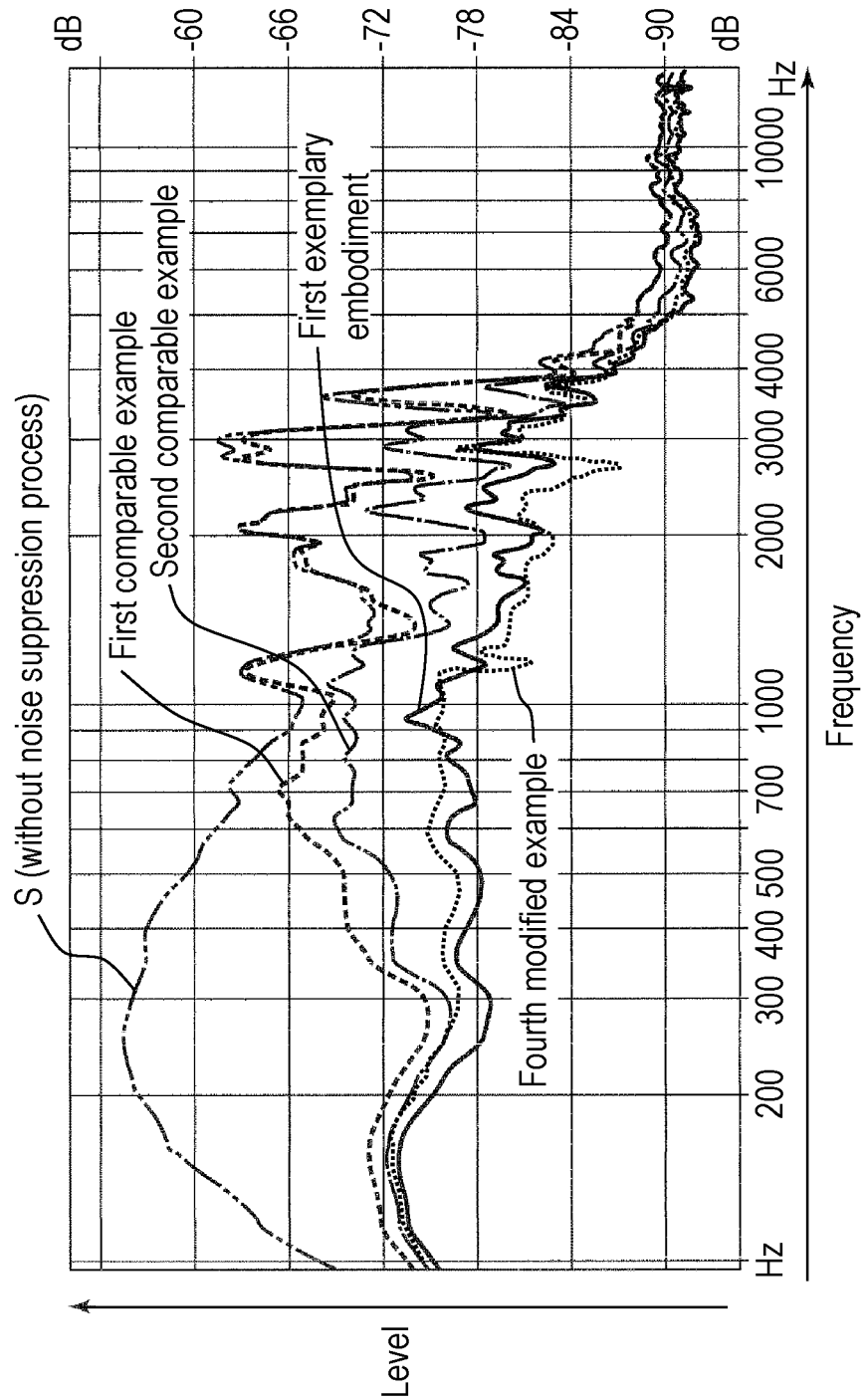
FIG. 13 is a diagram showing measurement results of noise levels in various arrangement configurations of the reference microphone.

FIG. 13 is a diagram showing measurement results of the noise levels in various arrangement configurations of reference microphone 111N. The horizontal axis of FIG. 13 represents the frequency Hz of the sound signal collected by the sound pick-up device, and the vertical axis represents the level dB of the sound signal.

In FIG. 13, the curved line S denoted by a two-dot chain line represents the waveform of the sound signal collected by main microphone 111R and main microphone 111L in the case that the above noise suppression process was not performed by digital image and sound processor 120.

In FIG. 13, the curved line denoted by a solid line (the first exemplary embodiment) represents the waveform of the sound signal which was output from the sound pick-up device in which main microphone 111R (main microphone 111L) and the reference microphone 111N were arranged as the first exemplary embodiment shown in FIG. 5.

In FIG. 13, the curved line denoted by a dotted line (the fourth modified example) represents the waveform of the sound signal which was output from the sound pick-up device in which main microphone 111R (main microphone 111L) and reference microphone 111N were arranged as the fourth modified example shown in FIG. 10.

Figure 14:
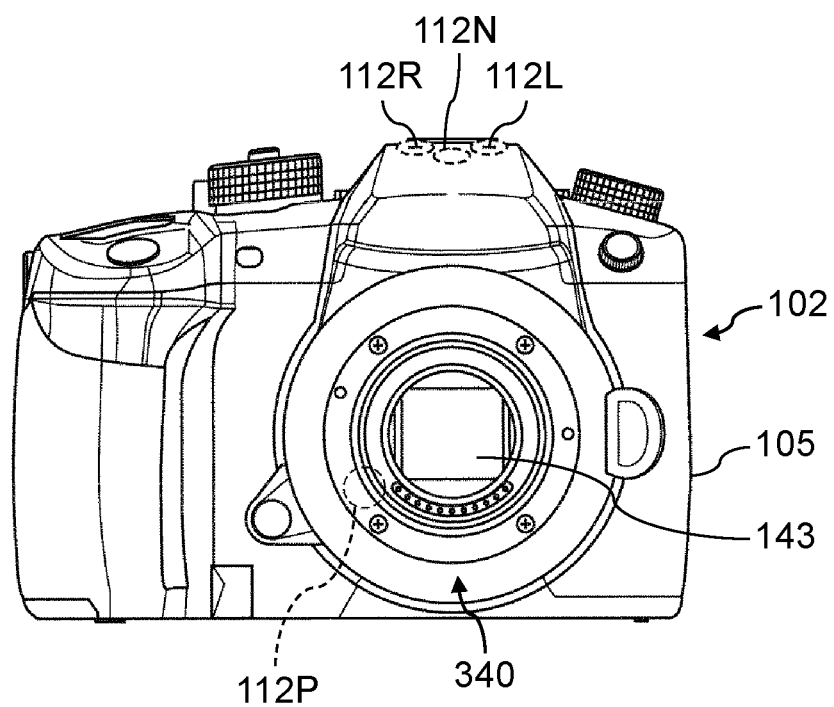
FIG. 14 is a diagram showing positions of a main microphone and a reference microphone of an imaging device of a first comparative example.

In FIG. 13, the curved line denoted by a broken line (a first comparative example) represents the waveform of the sound signal which was output from the sound pick-up device in the case that reference microphone 111N was disposed away from main microphone 111R and main microphone 111L. In the first comparative example, the distance between main microphone 111R and main microphone 111L was 15 mm as shown in FIG. 14 in the same way as in the first exemplary embodiment. However, in the first comparative example, different from the first exemplary embodiment, reference microphone 111N was disposed in the vicinity of a noise source. Specifically, as shown in FIG. 14, reference microphone 111N was disposed in area 112P in the vicinity of BIS driver 181, which was a noise source, in the inside of camera body 102.

Figure 15:
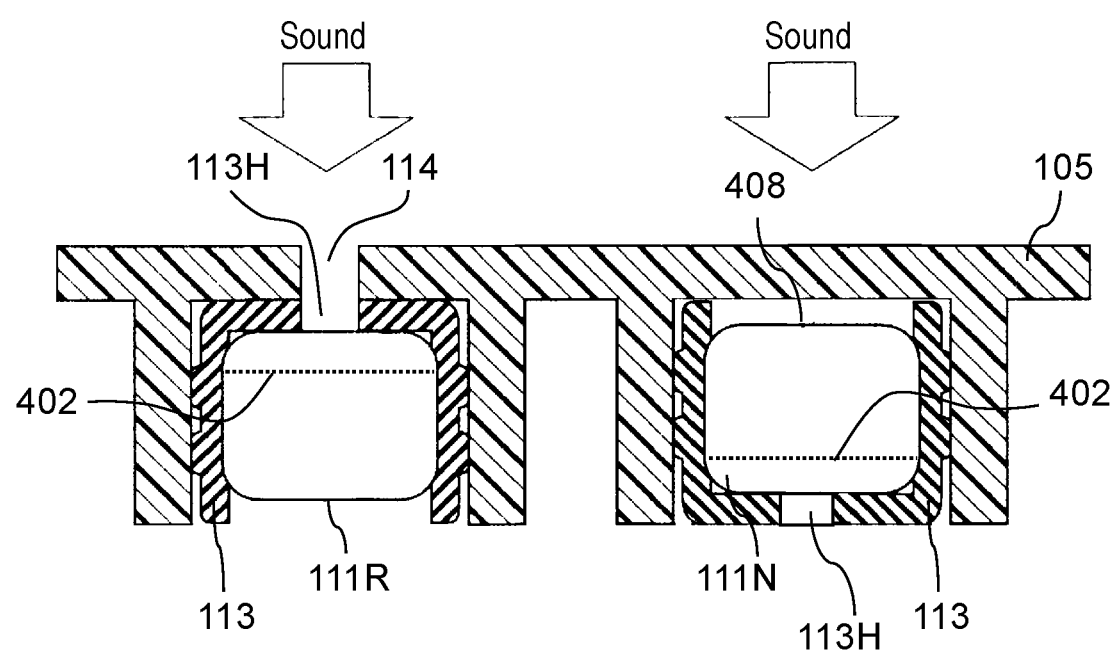
FIG. 15 is a diagram showing an arrangement configuration of a main microphone and a reference microphone of a second comparative example.

In FIG. 13, the curved line (a second comparative example) denoted by a one-dot chain line represents the waveform of the sound signal which was output from the sound pick-up device in the case that reference microphone 111N is disposed as shown in FIG. 15. In the second comparative example, reference microphone 111N is disposed in the direction which is turned by 180 degrees from the direction of main microphone 111R as shown in FIG. 15. Further, in the second comparative example, sound hole 113H is formed in rubber member 113. Further, above reference microphone 111N, sound hole 114 is not formed in case 105. In this case, case 105 and printed circuit board 408 of reference microphone 111N block between the outside of case 105 and the inside of reference microphone 111N. Further, because rubber member 113 has sound hole 113H, the inside of case 105 and the inside of reference microphone 111N are communicated and are not blocked from each other.

That is, in the second comparative example, case 105 and printed circuit board 408 of reference microphone 111N correspond to the second shield, but there is no member corresponding to the third shield. Note that FIG. 12 also illustrates the arrangement configuration of the reference microphone in the second comparative example.

With reference to the results in FIG. 13, the comparison between the first comparative example and the first exemplary embodiment shows that a higher noise suppression effect can be obtained in the case (the first exemplary embodiment) that reference microphone 111N is disposed at a position 112N in the vicinity of main microphone 111L and main microphone 111R as the first exemplary embodiment than in the case (the first comparative example) that reference microphone 111N is disposed in area 112P at a position in the vicinity of the noise source.

Further, the comparison between the second comparative example and the first exemplary embodiment in FIG. 13 shows that a higher noise suppression effect can be obtained in the case that reference microphone 111N is disposed in area 112N at a position in the vicinity of main microphone 111R and main microphone 111L and that the second shield and the third shield are disposed with respect to reference microphone 111N.

Further, the comparison between the fourth modified example and the first exemplary embodiment in FIG. 13 shows that a high noise suppression effect can be obtained in both of the fourth modified example and the first exemplary embodiment. Therefore, if the second shield and the third shield are realized by any component, the similar noise suppression effect is achieved.

[1-5. Advantageous Effect and the Like]

Digital camera 100 (an example of the imaging device) of the first exemplary embodiment is equipped with a sound pick-up device. The sound pick-up device of digital camera 100 is equipped with: case 105 (housing) having sound hole 114; main microphone 111R and main microphone 111L which are disposed in the inside of case 105 and each of which receives through sound hole 114 sound pressure from the outside of case 105 to generate a first sound signal; reference microphone 111N which is disposed in the inside of case 105 and in a proximity of main microphone 111R and main microphone 111L and generates a second sound signal; a first shield which blocks between the inside of case 105 and the insides of main microphone 111R and main microphone 111L; a second shield which blocks between the outside of case 105 and the inside of reference microphone 111N; and a third shield which blocks between the inside of case 105 and the inside of reference microphone 111N. This arrangement can suppress noise in the first exemplary embodiment.

The main microphone of the first exemplary embodiment includes a first main microphone (for example, main microphone 111R) which acquires sound from a first direction, and a second main microphone (for example, main microphone 111L) which acquires sound from a second direction different from the first direction. With this arrangement, it is possible to collect sound from a plurality of directions in the first exemplary embodiment.

In the first exemplary embodiment, the distance between reference microphone 111N and first main microphone (for example, main microphone 111R) is equal to the distance between reference microphone 111N and second main microphone (for example, main microphone 111L). With this arrangement, in the first exemplary embodiment, it is possible to suppress the noise component of the sound signal from any of the main microphones.

In the first exemplary embodiment, rubber member 113 for fixing main microphone 111R and main microphone 111L to case 105 and rubber member 113 for fixing reference microphone 111N to case 105 may be the same. This configuration makes the component used in the first exemplary embodiment more versatile.

Further, in the first exemplary embodiment, as shown in FIG. 5, at least a part of the second shield is case 105, and at least a part of the third shield is the outer case (printed circuit board 408) of reference microphone 111N. This arrangement configuration is effective when main microphone 111R and main microphone 111L are intended to be disposed in the same direction as reference microphone 111N or when rubber members 113 having sound holes 113H are intended to be used.

In addition, as shown in FIG. 10, at least a part of the second shield may be the outer case (printed circuit board 408) of reference microphone 111N, and at least a part of the third shield may be rubber member 113 for fixing reference microphone 111N to case 105. This arrangement configuration is effective in the case that main microphone 111R and main microphone 111L are intended to be disposed in the direction opposite to the direction of reference microphone 111N or in the case that case 105 having sound holes 114 is intended to be used. In addition, regarding the directions of the microphones, it is possible to select from the arrangement configurations described in the first modified example to the fifth modified example, depending on the configuration of case 105, rubber member 113, or the like. However, the first modified example to the fifth modified example are just examples, and other arrangement configurations also can effectively suppress noise if the second shield and the third shield are appropriately disposed. The second shield and the third shield may be configured with any one of case 105, rubber member 113, case 401, and printed circuit board 408 or may be configured with another separately disposed member.

The sound pick-up device of the first exemplary embodiment is further equipped with a sound processor which obtains a noise component on the basis of the sound signal from reference microphone 111N and subtracts the noise component from the main sound signals from main microphone 111R and main microphone 111L. With this arrangement, the sound pick-up device itself can suppress the noise component.

Other Exemplary Embodiments

The first exemplary embodiment is described above as an example. However, the technologies of the present disclosure can be applied not only to the above exemplary embodiments but also to exemplary embodiments in which modification, replacement, addition, or removal is appropriately made. Further, the components described in the first exemplary embodiment can be combined to make a new exemplary embodiment.

In the first exemplary embodiment, as shown in FIG. 2A and FIG. 2B, reference microphone 111N is disposed anterior (object side) to main microphone 111R and main microphone 111L, on the camera; however, reference microphone 111N may be disposed on the back side of the camera with respect to main microphone 111R and main microphone 111L. Further, main microphone 111R, main microphone 111L, and reference microphone 111N are disposed on an upper part of digital camera 100 (which is an example of electronic device); however, these microphones may be disposed at other positions. For example, main microphone 111R, main microphone 111L, and reference microphone 111N may be disposed on a side surface or a front surface of digital camera 100.

Further, in the above exemplary embodiments, main microphone 111R, main microphone 111L, and reference microphone 111N are fixed to the recessed portions of case 105 through rubber members 113; however, other components may be used to fix the microphones to case 105. Further, the fixing member is not limited to rubber member 113.

In the above exemplary embodiments, the description is given, with reference to FIG. 6, on a noise suppression process in which noise included in a main sound signal generated by a main microphone is suppressed by using a noise signal generated by a reference microphone. However, the noise suppression process is not limited to the above, and various known methods can be applied.

In the above exemplary embodiments, the description is given on an example in which the sound pick-up device of the present disclosure is applied to an interchangeable lens digital camera; however, the sound pick-up device of the present disclosure can also be applied to a lens-body integrated digital camera.

In the above exemplary embodiments, a description is given on an example in which the sound pick-up device of the present disclosure is applied to a digital camera, however, it is possible to apply the configuration of the sound pick-up device of the present disclosure to other electronic devices. For example, the configuration of the sound pick-up device of the present disclosure can also be applied to other electronic devices (a video camera, an IC recorder, and the like) which acquires sound. The configuration of the sound pick-up device of the present disclosure is useful particularly for electronic device which has a noise source in the electronic device. Further, the configuration of the sound pick-up device of the present disclosure is useful particularly for dust and splash proof electronic device.

As described above, exemplary embodiments are described as examples of the technology in the present disclosure. For that purpose, the attached drawings and the detailed description are provided.

Therefore, the components described in the accompanying drawings and in the detailed description include not only components necessary for solving the problems, but also components unnecessary for solving the problems, in order to exemplify the above implementation. For this reason, it should not be immediately recognized that those unnecessary components are necessary just because those unnecessary components are described in the accompanying drawings and the detailed description.

In addition, because the above exemplary embodiments are for exemplifying the technology in the present disclosure, various modifications, replacements, additions, removals, or the like can be made without departing from the scope of the accompanying claims or the equivalent thereof.

The sound pick-up device of the present disclosure can generate a sound signal in which noise is suppressed by removing a noise component from a sound signal having been input, can be applied to electronic device (a video camera, an IC recorder, and the like) which acquires sound by converting the sound into an electric signal, and is useful, in particular, for electronic device having a noise source in the electronic device.

What is claimed is:

1. A sound pick-up device comprising:
a housing having recessed portions and a first sound hole;
a main microphone which is fixed in an inside of the housing with a main rubber fixing member, receives sound pressure from an outside of the housing through the first sound hole, and generates a first sound signal;
a reference microphone which is fixed in the inside of the housing with a reference rubber fixing member, the reference microphone being disposed in a proximity of the main microphone and which generates a second sound signal, wherein the reference microphone includes a face through which a second sound hole extends;
a first shield which blocks sound pressure from being transmitted between the inside of the housing and an inside of the main microphone;
a second shield configured such that air is not transmitted between the outside of the housing and an inside of the reference microphone so as to block sound pressure from being transmitted between the outside of the housing and the inside of the reference microphone; and
a third shield which blocks sound pressure from being transmitted between the inside of the housing and the inside of the reference microphone,
wherein the face of the reference microphone through which the second sound hole extends directly contacts an opposing face of the reference rubber fixing member and
wherein the main microphone and the reference microphone are pressure-inserted into the recessed portions of the housing by elastically deforming the main rubber fixing member and the reference rubber fixing member, respectively.

2. The sound pick-up device according to claim 1, wherein
the main microphone includes:
a first main microphone which acquires sound from a first direction; and
a second main microphone which acquires sound from a second direction different from the first direction.

3. The sound pick-up device according to claim 2, wherein
a distance between the reference microphone and the first main microphone is equal to a distance between the reference microphone and the second main microphone.

4. The sound pick-up device according to claim 1, wherein
the main rubber fixing member is identical in cross section to the reference rubber fixing member.

5. The sound pick-up device according to claim 1, wherein
at least a part of the second shield is the housing, and
at least a part of the third shield is an outer case of the reference microphone.

6. The sound pick-up device according to claim 1, wherein
at least a part of the second shield is an outer case of the reference microphone, and
at least a part of the third shield is the reference rubber fixing member.

7. The sound pick-up device according to claim 1, further comprising
a sound processor which obtains a noise component, based on the second sound signal, and subtracts the noise component from the first sound signal.

8. An imaging device comprising:
an imaging unit which takes an image of an object to generate an image signal;
the sound pick-up device according to claim 1, the sound pick-up device acquiring sound to generate a sound signal; and
a controller which stores the image signal in a predetermined recording medium together with the sound signal.

9. The imaging device according to claim 8, wherein
the imaging device has a dust and splash proof sealed structure.

10. The imaging device according to claim 8, wherein
the imaging device has a image stabilization mechanism.

* * * * *